United States Patent
Arimilli et al.

(10) Patent No.: US 6,629,268 B1
(45) Date of Patent: Sep. 30, 2003

(54) METHOD AND APPARATUS FOR SERVICING A PROCESSING SYSTEM THROUGH A TEST PORT

(75) Inventors: Ravi Kumar Arimilli, Austin, TX (US); Kevin F. Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/491,029

(22) Filed: Jan. 25, 2000

(51) Int. Cl.[7] .............................................. G06F 11/00
(52) U.S. Cl. ........................................ 714/42; 711/135
(58) Field of Search .................................. 711/135, 141, 711/144; 714/12, 42, 734, 726, 31, 30, 10

(56) References Cited

U.S. PATENT DOCUMENTS

| | | | |
|---|---|---|---|
| 5,561,761 A | * 10/1996 | Hicok et al. | 714/30 |
| 5,590,354 A | * 12/1996 | Klapproth et al. | 714/30 |
| 5,649,090 A | * 7/1997 | Edwards et al. | 714/10 |
| 6,055,656 A | * 4/2000 | Wilson et al. | 714/724 |
| 6,115,763 A | * 9/2000 | Douskey et al. | 710/20 |
| 6,142,683 A | * 11/2000 | Madduri | 703/23 |
| 6,263,373 B1 | * 7/2001 | Cromer et al. | 709/216 |
| 6,314,486 B1 | * 11/2001 | Schulz et al. | 710/10 |
| 6,314,491 B1 | * 11/2001 | Freerksen et al. | 711/124 |

* cited by examiner

Primary Examiner—Robert Beausoliel
Assistant Examiner—Marc Duncan
(74) Attorney, Agent, or Firm—Casimer K. Slays; Bracewell & Patterson, L.L.P.

(57) ABSTRACT

A method and apparatus for servicing a processing system through a test port allow initialization and fault recovery capability including the ability to coherently access cache memory while the processing system is operating. A JTAG standard interface is used to access registers in a main processing component and has the additional capability to generate internal bus transactions to access registers, cache and memory both within the main processor, and externally by causing a bus interface in the main processor to generate external bus transactions. The service processor can coherently access cache by this mechanism, allowing fault tolerant recovery from operations in which the cache must be coherently flushed in order to maintain proper system operation.

29 Claims, 6 Drawing Sheets

METHOD AND APPARATUS FOR SERVICING A PROCESSING SYSTEM THROUGH A TEST PORT

BACKGROUND OF THE INVENTION

1. Technical Field

The present invention relates generally to computer systems, and more specifically to a method and apparatus for servicing a processing system. In particular, the present invention makes use of a service processor that can access cache memory and control registers within a processor core by generating operations on an internal bus of one or more main processors.

2. Description of the Related Art

Modern computer systems have grown sufficiently complex that secondary service processors are used to provide initialization of the computer system, allowing synchronization of their many components and, in some cases, startup assistance to components that do not completely self-initialize. In today's multiprocessor computer systems, data values and instructions are preloaded, and out-of-order execution is supported, making the synchronization and reliability of the processing cores critical to proper operation.

Both multiprocessor and uniprocessor systems typically use multi-level cache memories where typically each higher level is smaller and has a shorter access time. The cache accessed by the main processor(s), and typically contained within the processor component of present systems, is typically has the least storage. Both data and instructions are cached, and data and instruction cache entries are typically loaded by prefetch units and branch prediction units before they are needed by an execution unit. At any time, these caches may contain values associated with multiple threads of execution and possibly multiple potential streams of execution loaded in accordance with predictions made by branch prediction and prefetch units. When an error occurs, resynchronizing the contents and coherence state of all of the caches in the system can be a complex tracing problem.

During initialization of a computer system, the service processor performs such tasks as controlling preloading cache memory and initializing of the individual processor cores before the cores are enabled for processing instructions. The service processor may also handle error events occurring in the system and may take a processor off-line if a fault has occurred or if the processor fails to initialize. Design trends in modern processor cores make use of this service processor increasingly prevalent, and the tasks which the service processor must perform are also increasing in number, due to the complexity of the memory hierarchy and the number of execution and control units within the core. The service processor helps to sequence proper startup by presetting control registers within the core, controlling the various execution and control units and presetting the arrangement of the memory hierarchy before the main processors are enabled to execute instructions.

As the speed of processors increases, the use of dynamic circuits and asynchronously timed interconnects force modern processing system designs toward fault tolerant operation.

The initialization and synchronization requirements of the processing systems also increase. Rather than removing a processor from a multiprocessing system, or restarting a processor, an approach geared toward dynamic fault recovery is needed. In addition, processing systems must be designed to handle certain fault rates, as opposed to past processing systems wherein a single fault usually required halting execution of a processor pending correction of the fault. Fault tolerance in the past has been directed at handling software faults, which occur due to the difficulty of handling all combinations of execution that might occur on one or more processors in a particular sequence of instructions. The new trends in circuit designs increase the need for tolerance of hardware faults, which have been corrected in the past by a hardware reset.

The need for a fault tolerant design methodology comes in part from the increasing demand for reliability and increasing processing speeds from consumers. One way to increase the rate at which a circuit can evaluate the next state in a computational engine is to permit an increase in the error rate for that evaluation.

An error in evaluation in processor control logic, however, can be fatal to execution in the core. Unlike a data error or an unpredicted program path, a control fault can create an unexpected next state from which there is no recovery. Also, it is difficult or impossible to evaluate all of the possible next state conditions due to errors. Even if the error rates are very low, an error occurring at low frequency (even on the order of days) must be either avoided or made recoverable.

Present computer systems, when faced with a core error, can reset the core. For a multiprocessor system, this is not a simple operation, as the interdependencies of memory values based on cache storage raise the potential to corrupt computations being performed on the entire machine. An individual execution unit may have an associated cache containing values that have been modified, but not flushed to a lower level of the memory hierarchy accessible to other execution units. These values are marked as "dirty" in the other levels of the hierarchy, and can cause halting in other execution units which require the values, until the values are replaced. If the values were held in a cache associated with an execution unit which faulted, it may be necessary to restart the entire machine, or restart all of the software processes executing on the machine. Even in a uniprocessor system, multithreading operation can make cache synchronization after an execution fault a difficult or impossible task.

In light of the foregoing, it would be desirable to provide an improved service processor and a method of managing processing systems that allows enhanced fault detection and fault handling in uniprocessor and multiprocessor systems.

SUMMARY OF THE INVENTION

The above objectives are achieved in a method and apparatus for servicing a processing system component through a test port, including an interface means coupled to the test port for generating a transaction on a bus internal to the processing system component when the test port receives at least one state control command for setting the state of the internal bus.

Alternatively, apparatus may include service logic means which determines if a command is a transaction command and the interface means may generate the transaction directly. The interface further returns results of a transaction when the test port receives a read result command for reading a result of the transaction. The test port used may be a JTAG interface and may also include an attention signal coupled from the processing system component to the service processor for alerting the service processor that the processing system component needs attention. The attention signal may be made physically larger for reliability. The interface means may coherently access cache or flush cache inside or outside the main processor, by virtue of the fact that the bus cycles are generated in consonance with the operation of the internal bus. Memory, cache, or control registers in other processors may be accessed by the interface, since any memory mapped component in the system can be accessed if it has a flat address in global memory space.

Accessing a location outside of the processing system component will cause a bus interface within the processing system component to generate an external bus cycle on a bus to which the processor is coupled, in order to access external devices. Cache flush operations may be performed by generating read-with-intent-to-modify cycles addressing cache locations, which will cause the cache controller to mark the locations as "dirty".

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF AN ILLUSTRATIVE EMBODIMENT

Figure 1:
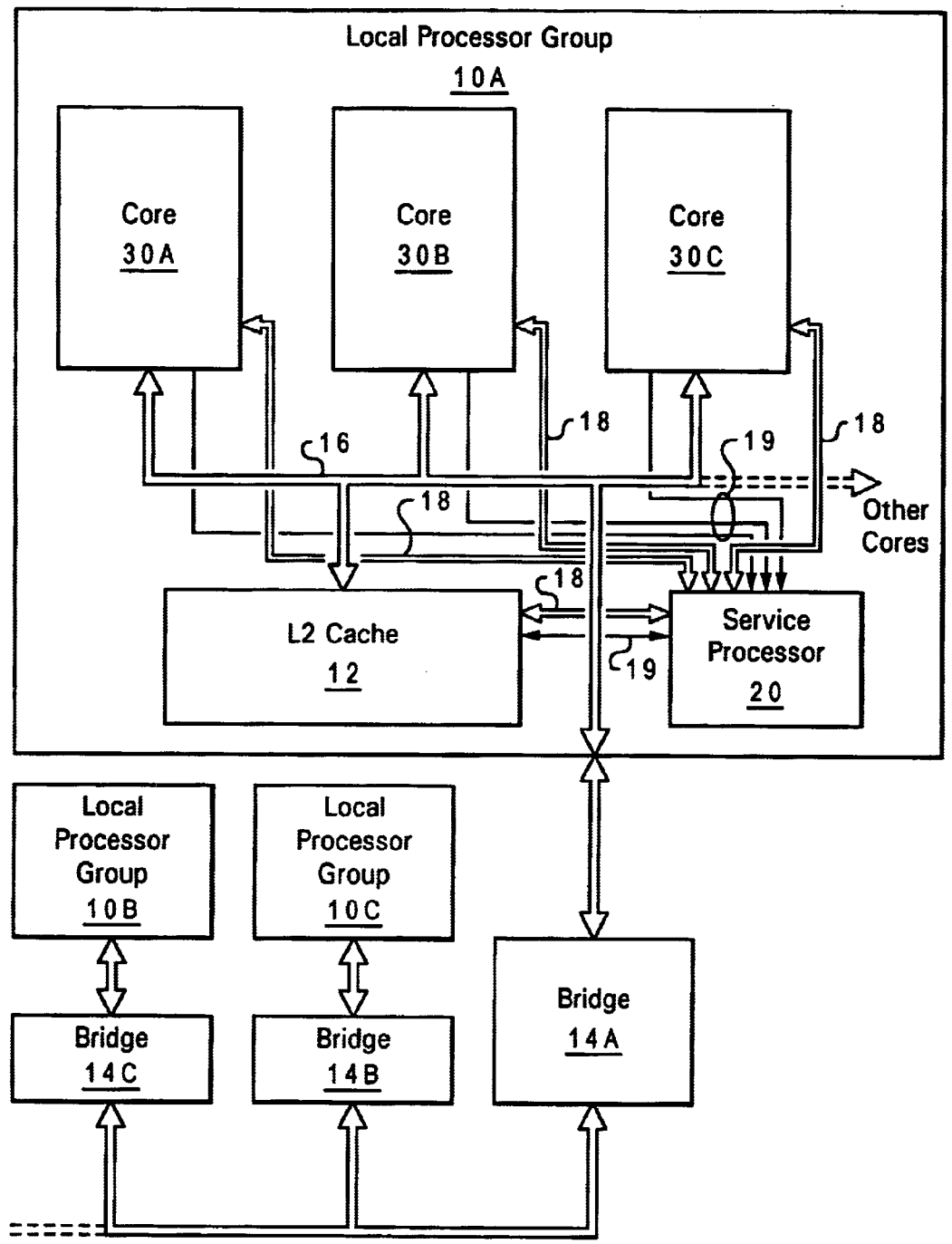
FIG. 1 is a block diagram of a multiprocessor system having a service processor interface, in accordance with a preferred embodiment of the present invention.

With reference now to the figures, and in particular with reference to FIG. 1, there is shown a multiprocessor system in accordance with a preferred embodiment of the present invention. The multiprocessor system is a connection of local processor groups 10 that perform program operations. This arrangement is particularly useful for scalar mathematical operations such as array multiplication and inversion. Local processor groups comprise cores 30A–30C that may contain caches or other local storage and the processor groups share a level of cache or memory, specifically L2 cache 12 in this example, that can be accessed by all of the processors in a group, and optionally by other local processing groups through bridges 14. Cores 30, are coupled together, to L2 cache 12, and to bridge 14A, by local bus 16.

Service processor 20 provides supervisory and error recovery operation in accordance with the present invention via a set of Joint Test Action Group (JTAG) interface. The details of the JTAG interface are defined by IEEE (Institute of Electrical and Electronics Engineers) Standard 1149.1— IEEE Standard Test Access Port and Boundary Scan Architecture. The interfaces used are not restricted to JTAG type interfaces, but it is convenient to use the JTAG hardware layer and protocols substantially compatible with the JTAG standard interface in order to provide compatibility with test equipment commonly available at present.

Service processor 20 is coupled to cores 30A–30C and L2 cache 12 by attention lines 19 and JTAG connections 18. JTAG connections 18 allow control of registers and functions within cores 30 and L2 cache 12 such as boundary scan registers and control bits within the functional blocks included in cores 30 and L2 cache 12.

A novel feature of the present invention is an extension of the functionality of JTAG connections 18 to include special commands for execution of control instructions, modification of registers, reset of functional blocks, and coherent access to cache, memory, and other bus-coupled features by generating bus cycles internal to core 30. Attention lines 19 are used by the individual processing system components interfaced to service processor 20 to signal for attention. Service processor 20 may then respond by querying status and taking necessary remedial action via JTAG connections 18.

Figure 2:
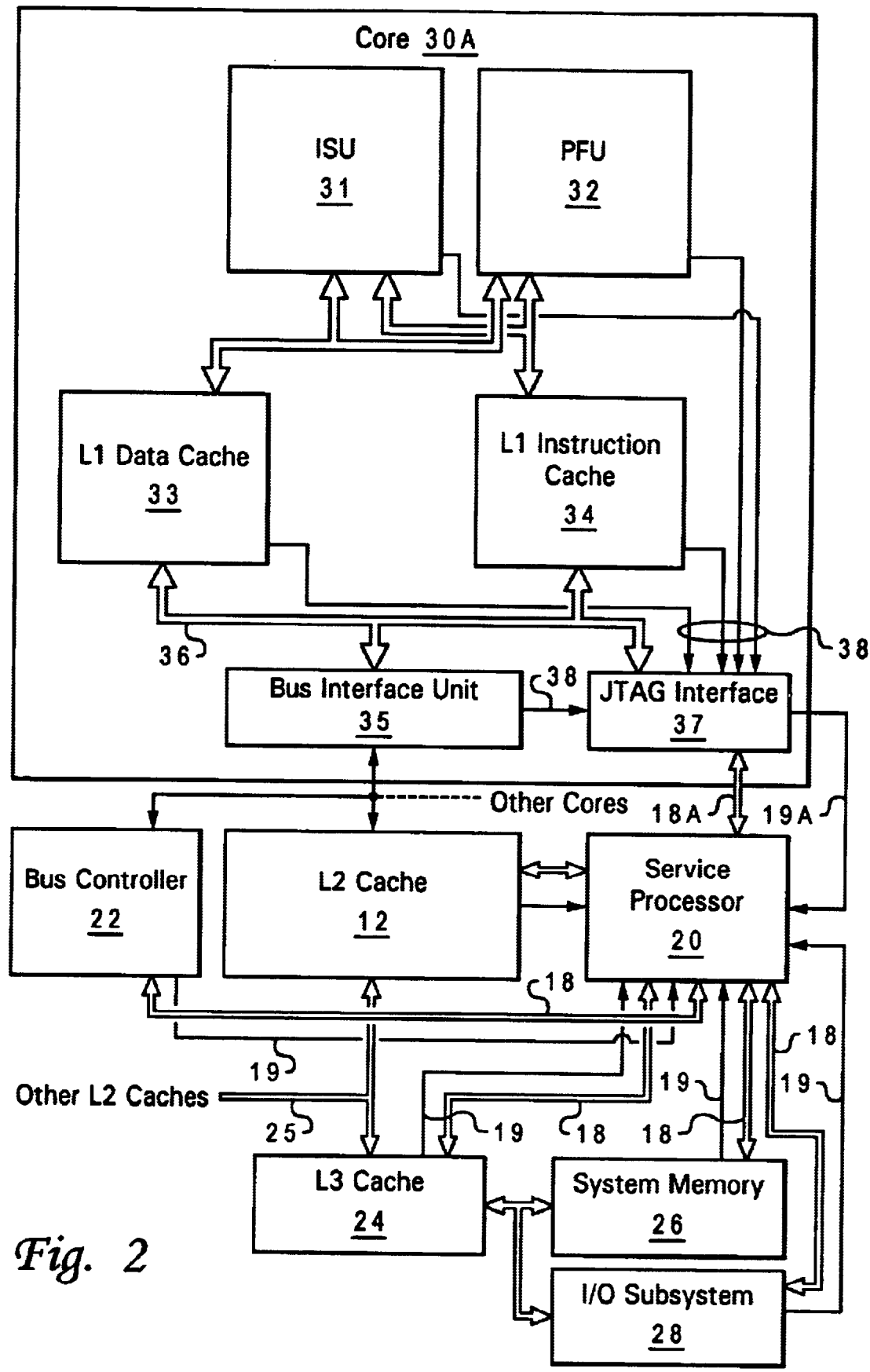
FIG. 2 is a block diagram of a processor and other system components coupled to the service processor from FIG. 1, in accordance with a preferred embodiment of the present invention.

Referring now to FIG. 2, a processor core 30A and associated processing system components are shown. An instruction sequencer unit (ISU) 31 and a prefetch unit (PFU) 32 are coupled to two caches. An L1 data cache 33 is used to store operand data, that is, values that are operated on by processor instructions. An L1 instruction cache 34 is used to store instructions to be executed by ISU 31. L1 caches 33 and 34 are coupled to an external bus by bus interface unit 35.

Service processor 20 is coupled to processing system components 2 cache, core 30A, system memory 26, I/O subsystem 28, and L3 cache 24, by a series of JTAG connections 18 and attention lines 19. As described above, attention lines 19 indicate to service processor 20 that a particular block needs attention, and JTAG connections 18 provide the means for querying status and taking remedial measures by providing an interface that allows generation of internal bus cycles within the block that needs attention, or by generating an internal bus cycle in another block to reflect an internal bus cycle externally to reach the block that needs attention.

As part of core 30A, JTAG interface 37 is coupled to JTAG connection 18A from service processor 20. Within core 30A, JTAG interface 37 couples to each of ISU 31, PFU 32, L1 caches 33 and 34, and bus interface unit 35, via internal attention lines 38. These internal attention lines 38 allow the individual functional blocks to signal for attention from JTAG interface 37. Typically, internal attention signals 38 are combined in a logical OR operation (although other more complicated schemes, such as priority encoding could be applied) to produce external attention signal 19A, which propagates the request for attention to service processor 20. Service processor can then poll JTAG interface 37 via JTAG connection 18A to determine which internal attention signals 38 are active. JTAG interface 37 is further coupled to internal bus 36 (which uses a Power PC memory bus architecture), allowing internal bus 36 cycles to be generated in response to commands received by JTAG interface 37, or other responses such as functional block resets or internal register accesses, according to the particular command.

For a bus access command, a cycle type and flat memory address can be set, allowing access to many different types of values in a system. If the control registers in a functional block are memory mapped within the flat addressing scheme for the system, they can also be accessed via a bus access command.

Commands that access flat memory addresses corresponding to cache locations, memory locations, I/O locations, or internal registers located within other processing system components can also be accessed from a particular processing system component, since an internal bus cycle generated with an address corresponding to an external address will cause bus interface unit 35 to generate external bus cycles. This can either simplify an interface, by not requiring connection of all processing system components (the attention lines can still be connected, but access is through another component's JTAG interface), or a multiply-connected configuration, such as that shown in FIG. 2, may provide many paths for the same access.

By providing the ability to access values that are more directly connected via another interface, redundancy and ability to handle and recover from failures is enhanced. If, for example, core 30A has failed and JTAG interface 37 is inoperable, service processor 20 can communicate with core 30B and generate internal bus 36 cycles that will be reflected on external bus 16, accessing control registers or cache locations within core 30A to correct the fault. Cache operations may be a cache invalidation, for example, flushing instruction cache 34 to clear an execution problem, or a cache purge, which can mark data as invalid by performing read-with-intent-to-modify operations, which will free up a cache line that is being held by core 30A which is operating improperly. The cycle may also be an instruction block invalidate cycle, which processing systems typically are unable to create (this is an instruction used by the memory hierarchy). Using an instruction block invalidate cycle allows service processor 20 to flush the instruction cache 34. Other operations can be performed by generating any transaction cycle that the internal processing component bus supports. For example, load or store operations can be performed on the cache locations during processor initialization to correct a fault or for other purposes during system operation.

In addition to being able to perform fault recovery, JTAG interface 37 of the present invention can modify registers or generate internal bus cycles within a processing system component that is in a non-operating state. The processing system component may be defective, off-line or through operation may have entered a state which renders it temporarily non-operational. By accessing locations in the processing system component via the internal bus and/or altering control register locations, the interface can be used to perform diagnostics or attempt to restore the processing system component to an operating state.

JTAG interface 37 is a test port serial interface designed for boundary-scan testing of integrated circuits. It is not necessary to use the boundary scan protocols to practice the present invention, nor do the boundary scan registers need to be present in the processing system components. JTAG interface 37 is convenient for interfacing to test equipment and can provide the dual connection of a standard test interface, while providing the service processor interface of the present invention.

JTAG interface 37 is a four wire connection, including a synchronous clock, serial data input and output signals and a ground return. This provides an efficient connection in terms of pin-out and complexity, and is a highly reliable interface using relatively low speed connections in relation to processor internal and external bus frequencies.

Figure 3:
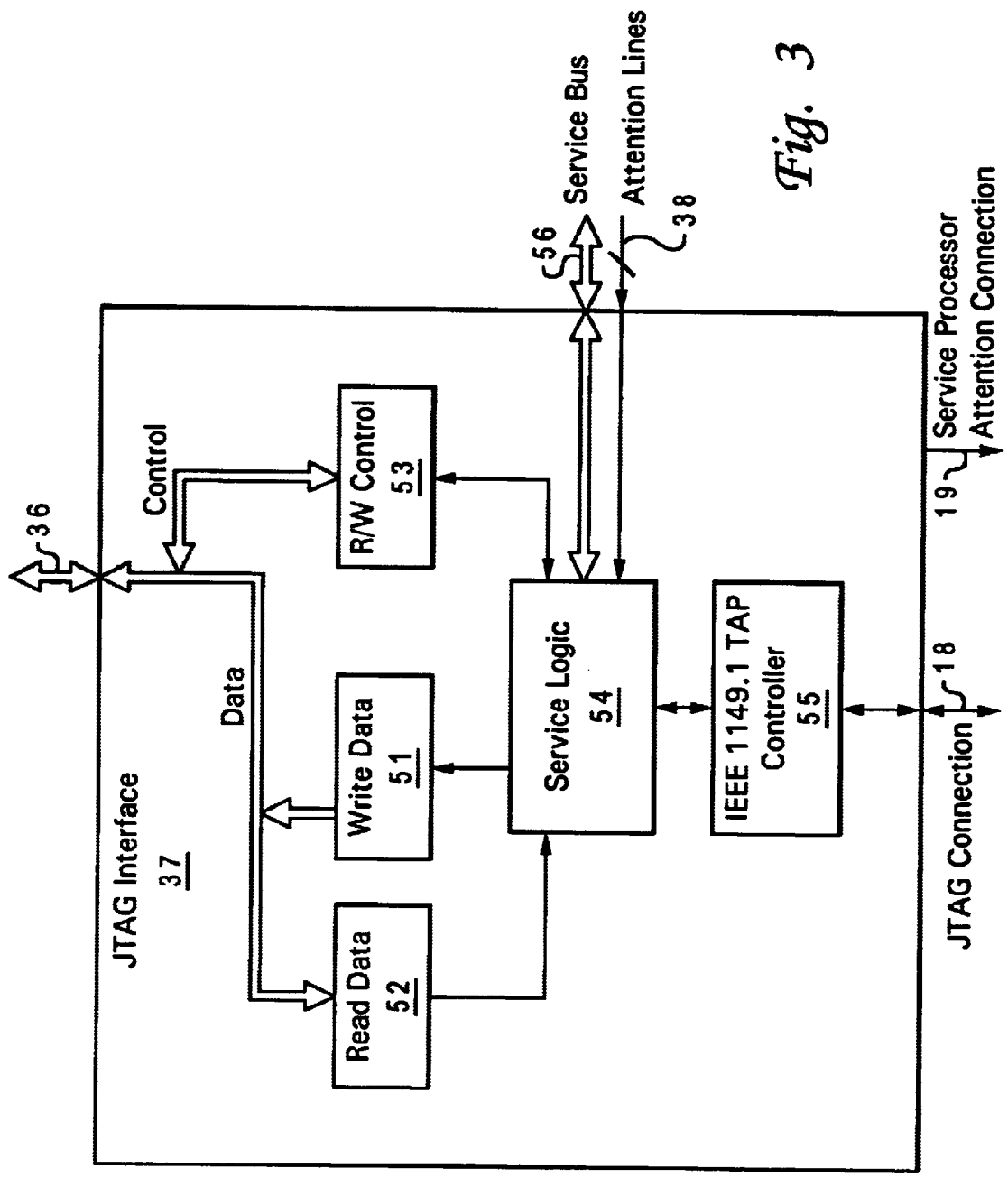
FIG. 3 is a block diagram of the service processor interface from FIG. 1, in accordance with a preferred embodiment of the present invention.

Referring now to FIG. 3, the details of the enhanced JTAG interface 37 of the present invention are depicted. JTAG Interface 37 can carry boundary scan transaction commands and data, internal control commands for modifying or reading control signals and status within core 30, or commands and data providing the internal bus access of the present invention. A TAP controller 55 connects the external JTAG connection 18 to service logic 54. Service logic 54 provides the boundary scan interface (if present) and the interface to internal registers of core 30A–30C via service bus 56. Service bus 56 can also control the sequencing of transactions generated by JTAG interface 37 on internal bus 36 by controlling the other connected internal core 30 functional blocks. Attention lines 38 provided from other core 30 functional blocks, are also connected to service logic 54 and are there combined to provide service processor attention connection 19.

Service logic 54 decodes the commands from TAP controller 55, and determines whether or not a internal bus access command is present. If the command is an internal bus access command, the bit values associated with the bus cycle to be generated are set and read from internal bus 36 directly.

The access to internal bus 36 is provided by read buffer 52, write register 51, and control register 53. By setting control register 53 bits, the state of internal bus 36 can be sequenced through any transaction supported by the bus protocol. In this illustrative embodiment, the control signals correspond to Power PC bus controls, and the data lines are Power PC data signals (which are set with address and data values during the appropriate portion of the bus cycle being generated). By setting the transfer type selector lines (TT0–4 in the Power PC bus specification) to specify an access cycle type, setting the address lines to an address value, an access address can be provided for a memory access cycle. The bus control lines can be cycled by bus control logic in service logic 54, or can be sequenced directly by changing bit values in control register 53.

R/W control 53 and write data 51 registers are connected to service logic 54 by serial interfaces that allow loading of each of the bits in the registers so that the state of the bus lines can be set. Likewise read data 52 buffer provides a serial output to service logic 54, so that the external JTAG connection 18 can be polled for a result from a read access cycle.

Figure 4:
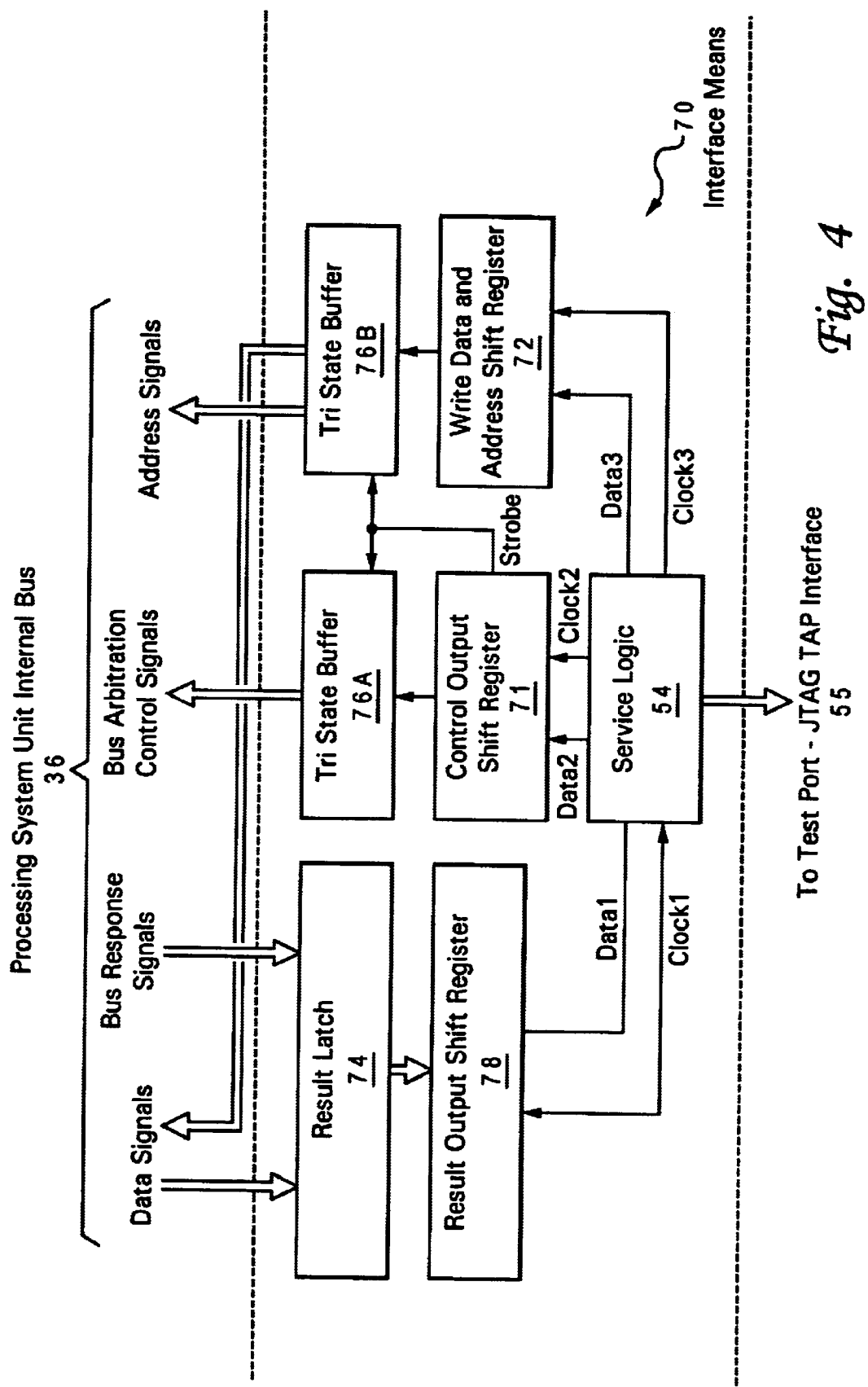
FIG. 4 is a block diagram of an interface means in accordance with a preferred embodiment of the present invention.

Referring now to FIG. 4, the details of interface means 70 will illustrate how service logic 54 provides control of internal bus 36. Bus arbitration and control signals, which allow interface means 70 to arbitrate for control of internal bus 36, and control the bus once the bus is "owned" by interface means 70, are coupled to interface means 70, by tri-state buffer 76A. Tri-state buffer 76A, is enabled by strobe signal, provided by one of the bits output from control output shift register 71, which receives serial input data Data2, provided by service logic 54. Commands sent to JTAG interface 37 specify the state of the bus arbitration and control signals by presetting the bits in control output shift register 71, allowing the bus to be sequenced through an arbitration cycle, and then an access cycle. The response from arbitrations or accesses are latched in result latch 74, and provided by a serial interface to service logic 54. The results from a bus cycle can then be provided to JTAG interface 37, when service logic 54 receives a command requesting the state of the bus or results from an access operation. Both data signals and bus response signals are coupled to result latch, allowing data results and bus state results to be read.

Address signals on internal bus 36 are driven by tri-state buffer 76B, when strobe is asserted, allowing the generation of address to allow access to locations mapped to internal bus 36. Write data and address shift register 72 is coupled via a serial interface provided by Data3 and Clock3 to allow service logic 54 to output an address when a command is received by JTAG interface 37 for setting address bits of internal bus 36.

Figure 5:
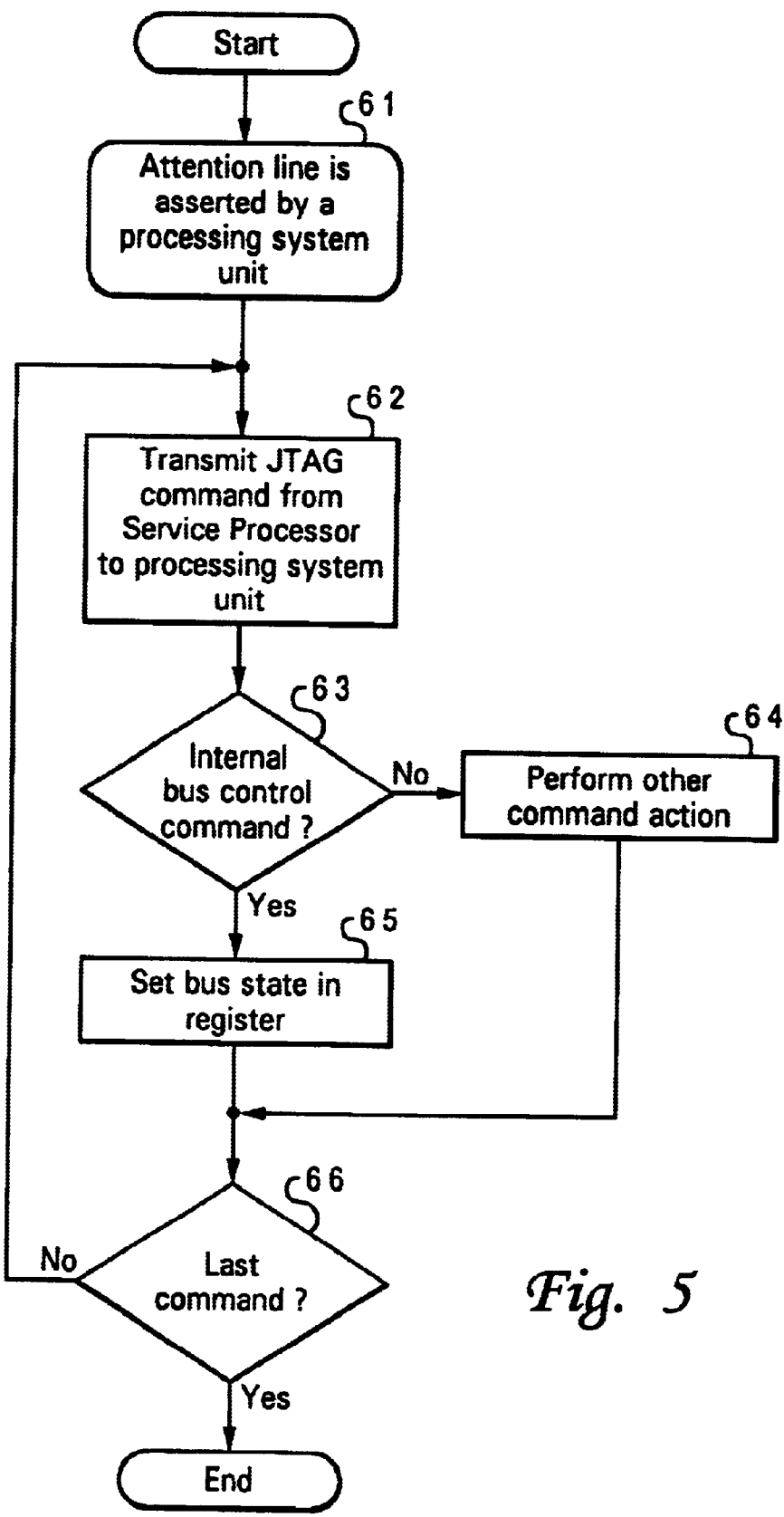
FIG. 5 is a flow diagram of a method for servicing a processor system through a test port by setting the state of an internal bus of a processing system component, in accordance with a preferred embodiment of the present invention.

Referring now to FIG. 5, a method for servicing a processor system through a test port by setting the state of an internal bus of a processing system component, in accordance with a preferred embodiment of the present invention, is shown. When attention line 19A is asserted by a processing system component such as core 30A (step 61), a JTAG command is transmitted from service processor 20 to the processing system component, for example, core 30A (step 62). If the command is an internal bus access command (decision 63), the state of the internal bus registers is set (step 65) via the operation of interface means 70, otherwise another task appropriate to the command is performed (step 64), such as access to internal control bits within core 30A or boundary scan operations as part of the operation of a standard JTAG interface. Internal bus 36 is sequenced by a series of commands sent through JTAG interface 37, until a last command is received (decision 66) and the desired transaction on internal bus 36 is accomplished. The bus access feature of the present invention does not interfere with the operation of the interface as a boundary scan interface, as the commands for internal bus access are separate from the boundary scan instruction set.

Figure 6:
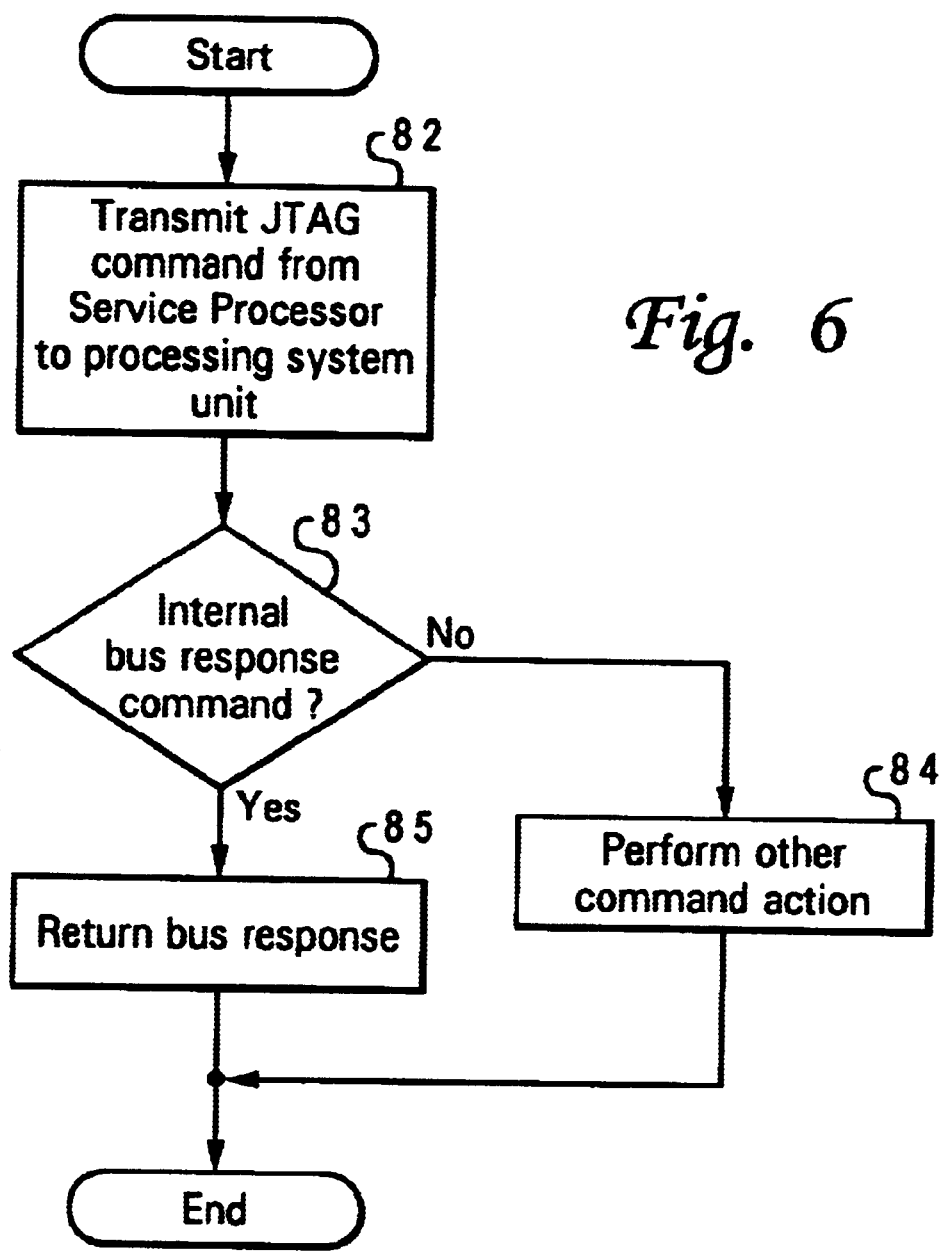
FIG. 6 is a flow diagram of a method for servicing a processor system through a test port by reading a response from of an internal bus of a processing system component, in accordance with an the preferred embodiment of the present invention.

Referring now to FIG. 6, a method for servicing a processor system through a test port by reading a response from an internal bus of a processing system component, in accordance with an the preferred embodiment of the present invention, is depicted. A JTAG command is transmitted from service processor 20 to a processing system component such as core 30A (step 82). If the command is an internal bus response command (decision 83), the bus response is returned from result latch 74 (step 85), via JTAG interface 37. If the command is not an internal bus response command, service logic performs the other appropriate command action (step 84).

While the above techniques apply to computer systems, and specifically, to a super-scalar processor system with cache memories, they are adaptable and contemplated to be useful in conjunction with other memory structures and other storage devices within a computer system. For example, the method might be used for coherently modifying a stand-alone cache circuit well as the internal processor cache of the illustrative embodiment.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A processing system comprising:
   one or more processing units including a particular processing unit, said particular processing unit including instruction execution circuitry, an internal cache coupled to said instruction execution circuitry, and an internal bus coupled to said internal cache, wherein said internal cache stores information and supplies said information to said instruction execution circuitry for processing;
   a memory system employing a cache coherency protocol to manage coherency with said internal cache;
   a service processor for managing said processing system;
   a test port coupling said particular processing unit to said service processor; and
   an interface means, coupled to said test port and to said internal bus, for generating a transaction on said internal bus of said particular processing unit in response to said test port receiving a first command from said service processor, and further for returning a result of said transaction to said service processor,
      wherein said transaction specifies an address corresponding to a storage location within said internal cache, and wherein said internal cache, responsive to receiving said transaction via said internal bus, updates a coherency state indicator associated with said storage location and transmits a communication associated with said address to said memory system in accordance with said coherency protocol.

2. The processing system of claim 1, wherein said test port comprises a test port in accordance with the Joint Test Action Group specification.

3. The processing system of claim 1, wherein said test port further comprises an attention signal provided by said particular processing unit and coupled to said service processor for directing an action of said service processor associated with said particular processing unit.

4. The processing system of claim 3, wherein said attention signal is a first attention signal, said processing system further comprising:
   a plurality of second attention signals internal to said particular processing unit and coupled to said interface means, wherein said interface means asserts said attention signal in response to assertion of at least one of said plurality of second attention signals by a component of said particular processing unit.

5. The processing system of claim 1, wherein said transaction coherently flushes said storage location by causing said internal cache to update said coherency state indicator to an invalid state and to write back modified information, if any, to said memory system.

6. The processing system of claim 5, wherein said transaction that flushes said storage location includes a read-with-intent-to-modify cycle.

7. The processing system of claim 6, wherein said internal cache is an instruction cache that stores only instruction information, and wherein said transaction flushes said storage location within said instruction cache.

8. The processing system of claim 1, wherein said interface means generates said transaction on said internal bus while said particular processing unit is in a fault state in which a hardware error has been detected within said particular processing unit.

9. The processing system of claim 1, wherein said interface means returns said result of said transaction to said service processor responsive to receiving an internal bus response read command from said service processor.

10. The processing system of claim 1, wherein said particular processing unit includes a memory mapped control register, and wherein said interface means, responsive to receipt of a second command, alters a setting of said memory mapped control register in conformance with said second command.

11. The processing system of claim 1, wherein:
said processing unit further comprises an external interconnect external to said particular processing unit;
said processing system further comprises a component external to said particular processing unit and coupled to said external interconnect, said component having an associated address;
said particular processing unit includes an interconnect interface unit coupled to said internal bus and coupled to said external interconnect; and
said interconnect interface unit, responsive to receipt of said transaction on said internal bus generated by said interface means, generates a transaction on said external interconnect, said transaction specifying said address associated with said component.

12. A processing system comprising:
a plurality of components including a particular processing unit, said particular processing unit including an internal bus and an interconnect interface unit coupled to said internal bus;
an external interconnect external to said particular processing unit that couples said plurality of components, wherein said particular processing unit is coupled to said external interconnect by said interconnect interface unit;
a service processor for managing said processing system;
a test port coupling said particular processing unit to said service processor, wherein said test port is separate from said interconnect interface unit; and
interface means, coupled to said test port and to said internal bus, for generating a transaction on said internal bus in response to said test port receiving a first command from said service processor and further for returning a result of said transaction to said service processor,
wherein said interconnect interface unit, responsive to receipt of said transaction on said internal bus generated by said interface means, generates a transaction on said external interconnect, said transaction specifying an address associated with one of said plurality of components.

13. The processing system of claim 12, wherein said test port further comprises an attention signal provided by said particular processing unit and coupled to said service processor for directing an action of said service processor associated with said particular processing unit.

14. The processing system of claim 12, wherein:
said particular processing unit includes instruction execution circuitry and internal cache storing information that said internal cache supplies to said instruction execution circuitry for processing, said internal cache containing a storage location having an address and an associated coherency state indicator;
said processing system further comprises a memory system, coupled to said external interconnect, that employs a cache coherency protocol to manage coherency with said internal cache;
said transaction comprises a first transaction;
said interface means, responsive to a second command, generates a second transaction on said internal bus specifying said address of said storage location; and
said internal cache, responsive to said second transaction, updates said coherency state indicator and transmits a communication associated with said address to said memory system in accordance with said coherency protocol.

15. The processing system of claim 14, wherein said second transaction coherently flushes said storage location by causing said internal cache to update said coherency state indicator to an invalid state and to write back modified information, if any, to said memory system.

16. The processing system of claim 15, wherein said second transaction that flushes said storage location includes a read-with-intent-to-modify cycle.

17. The processing system of claim 12, wherein said interface means generates said transaction on said internal bus while said particular processing unit is in a fault state in which a hardware error has been detected within said processing system.

18. A method for managing a processing system including a particular processing unit, said particular processing unit including instruction execution circuitry, an internal cache coupled to said instruction execution circuitry, and an internal bus coupled to said internal cache, said processing system further including a memory system, a service processor for managing said processing system, a test port coupling said particular processing unit to said service processor, and an service processor interface coupled to said test port and to said internal bus, said method comprising:
said internal cache storing information and supplying said information to said instruction execution circuitry for processing;
said memory system maintaining coherency with said internal cache utilizing a cache coherency protocol;
said service processor transmitting a command along with bus state information to said test port;
said service processor interface, responsive to said command and said bus state information, generating a transaction on said internal bus of said particular processing unit in conformance with said bus state information, wherein said transaction specifies an address corresponding to a storage location within said internal cache; and
in response to receiving said transaction via said internal bus, said internal cache updating a coherency state indicator associated with said storage location and transmitting a communication associated with said address to said memory system in accordance with said coherency protocol.

19. The method of claim 18, wherein said command comprises a first command, said method further comprising:
second transmitting a second command from said service processor to said test port;
said service processor interface determining that said second command is an internal bus response read command; and
responsive to said determining step, said service processor interface returning a result of said transaction to said service processor.

20. The method of claim 18, wherein said transaction comprises a first transaction, said method further comprising:

said service processor transmitting a second command to said test port;

said service processor interface generating a second transaction on said internal bus; and said particular processing unit altering a control register in an operating component of said particular processing unit in response to receipt of said second transaction.

21. The method of claim 18, wherein said transaction comprises a first transaction and said processing system further includes an external interconnect external to said particular processing unit, said method further comprising:

said service processor transmitting a second command to said test port;

said service processor interface generating a second transaction on said internal bus; and said particular processing unit generating a third transaction on said external bus in response to said second transaction on said internal bus.

22. The method of claim 21, wherein said particular processing unit is a first processing unit, said processing system includes a second processing unit having a control register, said method further comprising said second processing unit modifying contents of said control register in response to receipt of said third transaction via said external interconnect.

23. The method of claim 18, said method further comprising:

in response to receiving said transaction via said internal bus, said internal cache flushing said storage location, said flushing including setting said coherency state indicator to an invalid state.

24. The method of claim 23, wherein said transmitting a communication associated with said address comprises writing back modified data to said memory system.

25. The method of claim 24, wherein said generating a transaction comprises generating a read-with-intent-to-modify transaction specifying said address of said storage location.

26. The method of claim 23, wherein:

said internal cache is an instruction cache; and said step of storing information comprises storing only instruction information in said instruction cache.

27. The method of claim 18, wherein said test port is a JTAG interface and transmitting a command comprises transmitting said command to said particular processing unit using a JTAG hardware protocol.

28. The method of claim 18, wherein said generating a transaction comprises generating said transaction while said particular processing unit is in a fault state in which a hardware error has been detected within said particular processing unit.

29. The method of claim 18, further comprising the step of asserting an attention signal provided to said service processor by said particular processing unit, wherein transmitting said command is performed responsive to said attention signal being asserted.

* * * * *

UNITED STATES PATENT AND TRADEMARK OFFICE
CERTIFICATE OF CORRECTION

PATENT NO. : 6,629,268 B1
DATED : September 30, 2003
INVENTOR(S) : Arimilli et al.

It is certified that error appears in the above-identified patent and that said Letters Patent is hereby corrected as shown below:

Title page,
Item [74], *Attorney, Agent, or Firm*, please delete "Slays" and insert -- Salys --;

Column 1,
Line 50, please delete "modem" and insert -- modern --;

Column 4,
Line 45, please delete "components 2" and insert -- components L2 --

Signed and Sealed this

Ninth Day of November, 2004

JON W. DUDAS
*Director of the United States Patent and Trademark Office*